April 17, 1951 A. GIVAUDAN 2,548,967
THIRD DIMENSION PHOTOGRAPHIC PROJECTION SCREEN
Filed Sept. 16, 1949
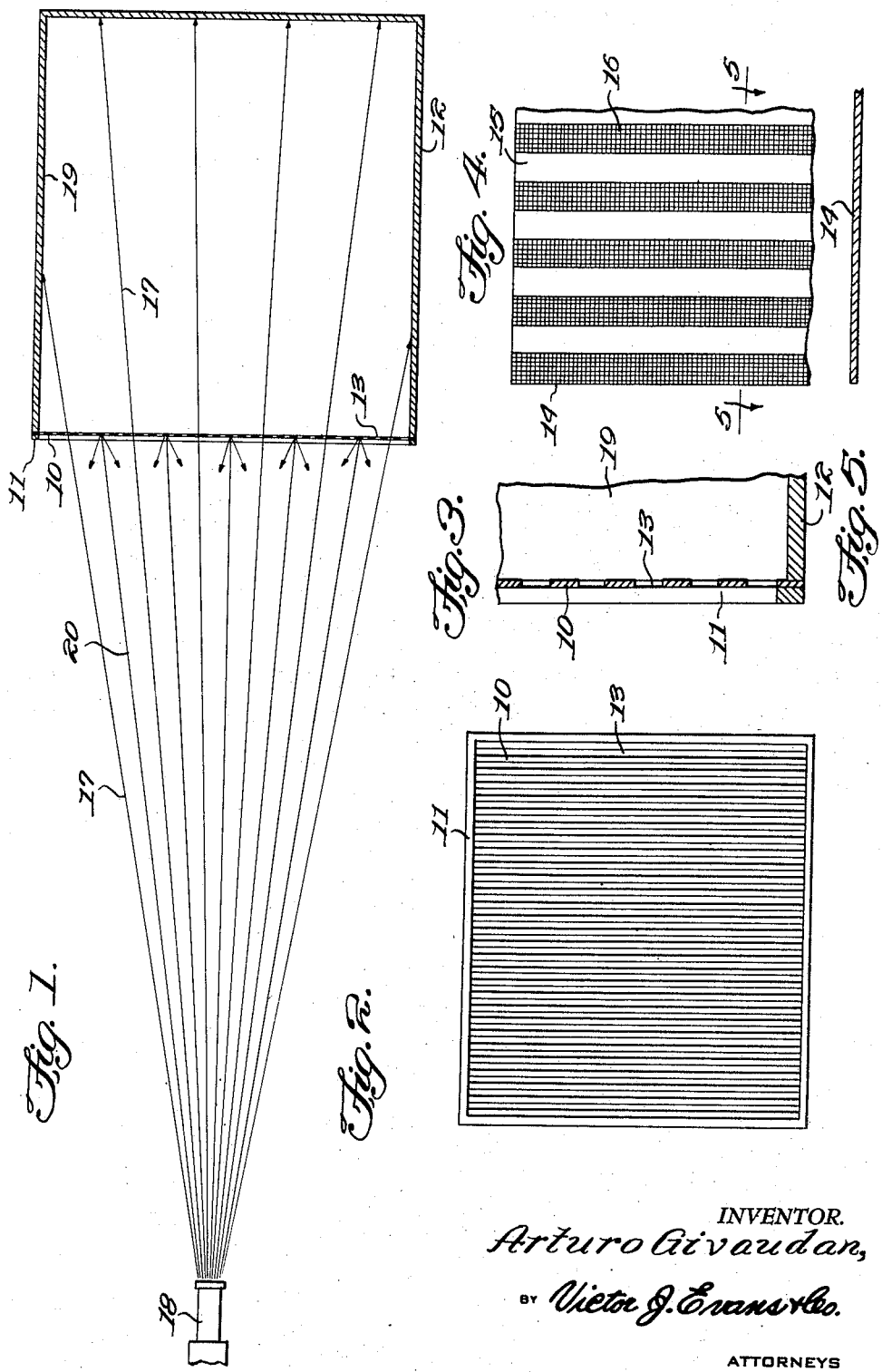
INVENTOR.
Arturo Givaudan,
BY Victor J. Evans & Co.
ATTORNEYS Patented Apr. 17, 1951

2,548,967

UNITED STATES PATENT OFFICE 2,548,967

THIRD DIMENSION PHOTOGRAPHIC PROJECTION SCREEN

Arturo Givaudan, Mexico City, Mexico

Application September 16, 1949, Serial No. 115,964

1 Claim. (Cl. 88—28.9)

This invention relates to screens for displaying projected images and pictures particularly as used in motion picture projection, and in particular a screen having a plurality of spaced vertically disposed strips or stripes having white exposed faces with dark areas between the strips in which the picture is displayed on the faces of the strips with alternate rows of rays absorbed by the areas between the strips.

The purpose of this invention is to provide means in a screen for projection that produces the feeling of depth in the usual projected picture or image.

Various devices have been used for obtaining the third dimension or depth in pictures, particularly by using a plurality of cameras but when the pictures are projected synchronization of the films is required and this requires costly and complicated apparatus.

The object of this invention is, therefore, to provide a screen that gives the feeling of depth to pictures projected from the usual type of negative or film.

Another object of the invention is to provide a screen upon which pictures may be projected that may be used with projectors now in use.

Another object of the invention is to provide means for absorbing alternate vertically disposed rows of rays of light in a screen upon which pictures are projected for the purpose of obtaining the third dimension in picture projection.

A further object of the invention is to provide a screen having a plurality of white and black strips or stripes which is of a simple and economical construction.

With these and other objects and advantages in view the invention embodies a box-like casing having black inner walls with a plurality of vertically disposed spaced white strips extended across an open end thereof.

The invention also includes a screen having parallel vertically disposed alternately arranged black and white stripes on the face thereof.

Other features and advantages of the invention will appear from the following description taken in connection with the drawings wherein:

Figure 1 is a sectional plan through the casing illustrating rays of light passing from a projector between vertically disposed strips in the open end of the casing and with alternate rows of rays of light striking the strips.

Figure 2 is a front elevational view of the casing shown in Figure 1 showing the spaced white strips mounted in a rectangular shaped frame.

Figure 3 is a detail showing one corner of the casing shown in Figure 1 on an enlarged scale illustrating the white strips mounted in a frame in the open end of the casing and with parts broken away.

Figure 4 is a view showing a modification wherein a plurality of alternately disposed white and black strips or stripes are provided on a screen.

Figure 5 is a cross section through the section of the screen shown in Figure 4 showing the face in a common plane.

Referring now to the drawings wherein like reference characters denote corresponding parts the improved third dimensional photographic projection screen of this invention includes a plurality of vertically disposed spaced white strips 10 mounted in a frame 11 and positioned in the open end of a box-like casing 12 and with open areas 13 between the strips.

The screen may also be provided as illustrated in Figures 4 and 5 wherein a panel 14 is provided with spaced vertically disposed stripes 15 and with black stripes 16 between the white stripes.

It will be understood that the screen may be formed in any suitable manner and the black and white stripes may be in the same plane or the black areas may be positioned in a housing or casing behind the white stripes or strips or formed in any suitable manner.

It will also be understood that the strips 10 or the screen 14 may be formed of fabric, plastic, metal or any suitable material.

In the illustration shown in Figure 1 rays of light 17 from a projector 18 pass through the open areas 13 between the strips and are absorbed by the black inner surface 19 in the casing 12. The inner surfaces 19 of the casing 12 may be painted or coated whereby the entire inner surface of the casing is black, or dark.

The rays 20 strike the strips 10 and provide the picture on the screen and with alternate rows of rays as indicated by the numeral 17 passing between the strips these rays are absorbed by the black inner surfaces of the casing or by the black stripes 16 in the design shown in Figure 4.

Absorbing alternate vertically disposed rows of rays of light of a picture produce the feeling of depth in the picture so that pictures or images having a third dimension appear on the screen.

It will be understood that although the strips or stripes are shown and described as being white it will be understood that they may have a slight tint or may be colored to produce different effects, as may be desired.

The frame 11 to which the strips 10 are carried is positioned against the open end of the casing 12 and may be secured in position by any suitable means.

It will be understood that other modifications may be made in the design and arrangement of the parts without departing from the spirit of the invention.

What is claimed is:

A projection screen comprising, a plurality of spaced vertically disposed reflecting elements, the spaces between said elements being equal in width to the width of the elements, a casing extending rearwardly from said spaced elements a distance equal to the width of the screen formed by said elements, said casing comprising closed upper, lower, side and rear walls, and having an open end on which the said spaced elements are located, said walls having an opaque non-reflecting material thereon to absorb the image passing through the space between said vertically disposed elements, and a strip, attached to the edge of the opening of the casing to locate the vertically disposed elements in a fixed relation to each other.

ARTURO GIVAUDAN.

REFERENCES CITED

The following references are of record in the file of this patent:

UNITED STATES PATENTS

| Number | Name | Date |
| --- | --- | --- |
| 1,650,341 | Goldstein | Nov. 22, 1927 |
| 2,210,806 | Etbauer | Aug. 6, 1940 |
| 2,313,947 | Klinkum | Mar. 16, 1943 |

FOREIGN PATENTS

| Number | Country | Date |
| --- | --- | --- |
| 327,023 | Great Britain | Mar. 27, 1930 |